(12) United States Patent
Kim

(10) Patent No.: US 11,188,273 B2
(45) Date of Patent: Nov. 30, 2021

(54) IMAGE FORMING APPARATUS USING CALENDAR INFORMATION AND METHOD OF USING IMAGE FORMING APPARATUS

(71) Applicant: Hewlett-Packard Development Company, L.P., Spring, TX (US)

(72) Inventor: Hongseock Kim, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/982,747

(22) PCT Filed: Jul. 30, 2018

(86) PCT No.: PCT/KR2018/008631
§ 371 (c)(1),
(2) Date: Sep. 21, 2020

(87) PCT Pub. No.: WO2019/198881
PCT Pub. Date: Oct. 17, 2019

(65) Prior Publication Data
US 2021/0011671 A1 Jan. 14, 2021

(30) Foreign Application Priority Data
Apr. 13, 2018 (KR) ........................ 10-2018-0043317

(51) Int. Cl.
*G06F 3/12* (2006.01)
(52) U.S. Cl.
CPC .......... *G06F 3/1204* (2013.01); *G06F 3/1224* (2013.01)

(58) Field of Classification Search
CPC combination set(s) only.
See application file for complete search history.

(56) References Cited

U.S. PATENT DOCUMENTS

| | | | |
|---|---|---|---|
| 2005/0094163 A1 | 5/2005 | Kim | |
| 2013/0250327 A1* | 9/2013 | Saitoh | H04N 1/00482 358/1.13 |
| 2014/0176998 A1* | 6/2014 | Nakata | G06F 3/1232 358/1.15 |
| 2015/0007109 A1 | 1/2015 | Yun | |
| 2015/0029539 A1* | 1/2015 | Kim | H04N 1/00352 358/1.15 |
| 2015/0029544 A1* | 1/2015 | Yun | G06F 3/1271 358/1.15 |

(Continued)

FOREIGN PATENT DOCUMENTS

| | | | |
|---|---|---|---|
| EP | 1 793 582 A2 | 6/2007 | |
| EP | 3 118 735 A1 | 1/2017 | |

(Continued)

*Primary Examiner* — Helen Zong
(74) *Attorney, Agent, or Firm* — Jefferson IP Law, LLP

(57) ABSTRACT

An image forming apparatus and method for using calendar information are provided. The image forming apparatus includes a display to display a user interface window for selecting a function supported by the image forming apparatus, a communication device to receive, from a calendar server, schedule information of the image forming apparatus and user information corresponding a particular schedule, and a processor to control the display to display a user interface window for a schedule corresponding to a current time and user information corresponding to the schedule.

20 Claims, 6 Drawing Sheets

(56) References Cited

U.S. PATENT DOCUMENTS

| | | | |
|---|---|---|---|
| 2015/0277810 A1 | 10/2015 | Fukasawa | |
| 2016/0098232 A1* | 4/2016 | Sato | G06F 21/608 |
| | | | 358/1.14 |
| 2016/0098234 A1* | 4/2016 | Weaver | G06K 15/02 |
| | | | 358/1.15 |
| 2017/0279885 A1 | 9/2017 | Kobayashi et al. | |

FOREIGN PATENT DOCUMENTS

| | | |
|---|---|---|
| JP | 2015-9432 A | 1/2015 |
| JP | 2015-52900 A | 3/2015 |
| KR | 10-2015-0014318 A | 2/2015 |
| KR | 10-2018-0012579 A | 2/2018 |

* cited by examiner

[Fig. 1]
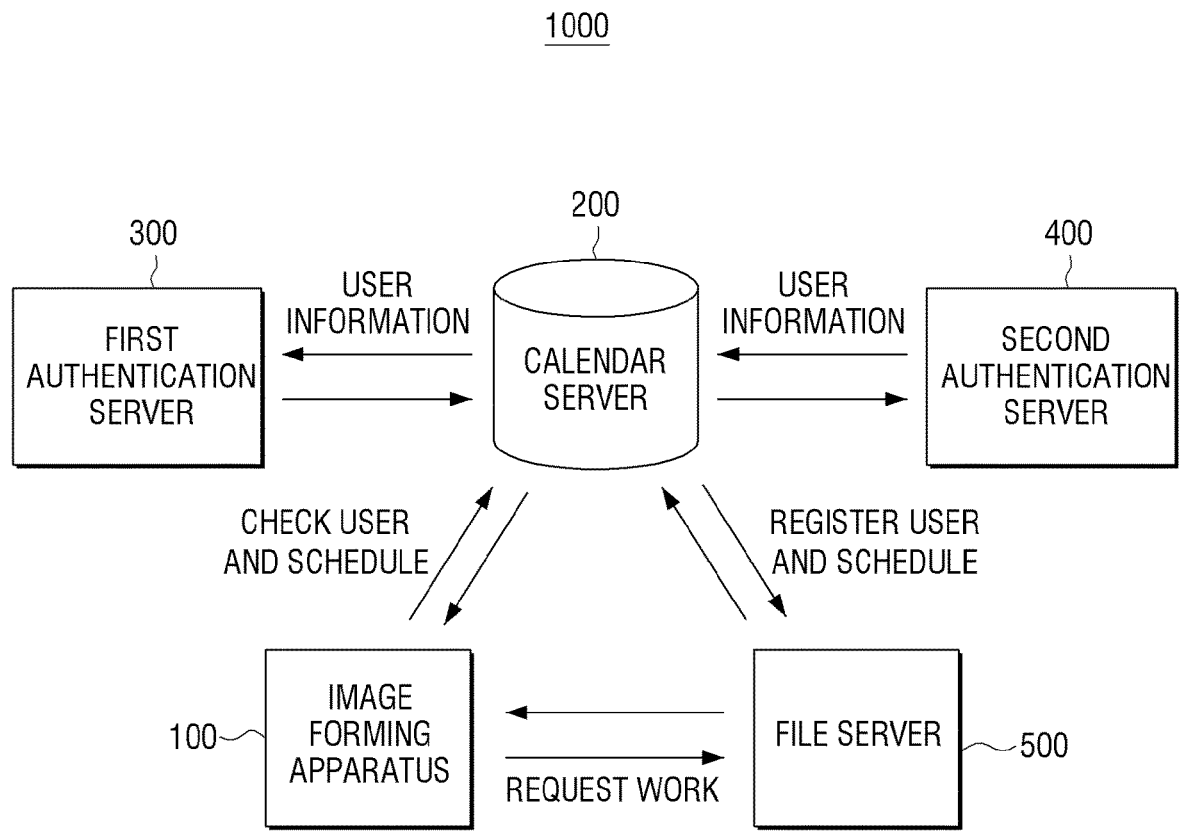
[Fig. 2]
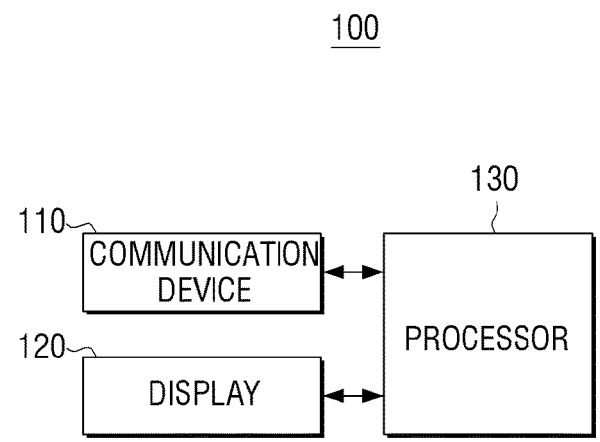

[Fig. 3]
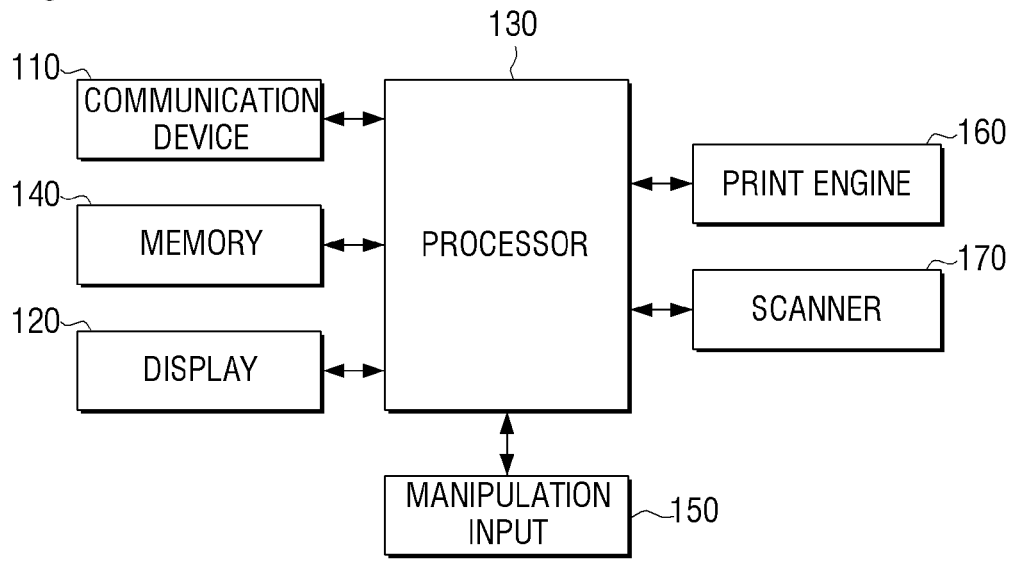
[Fig. 4]
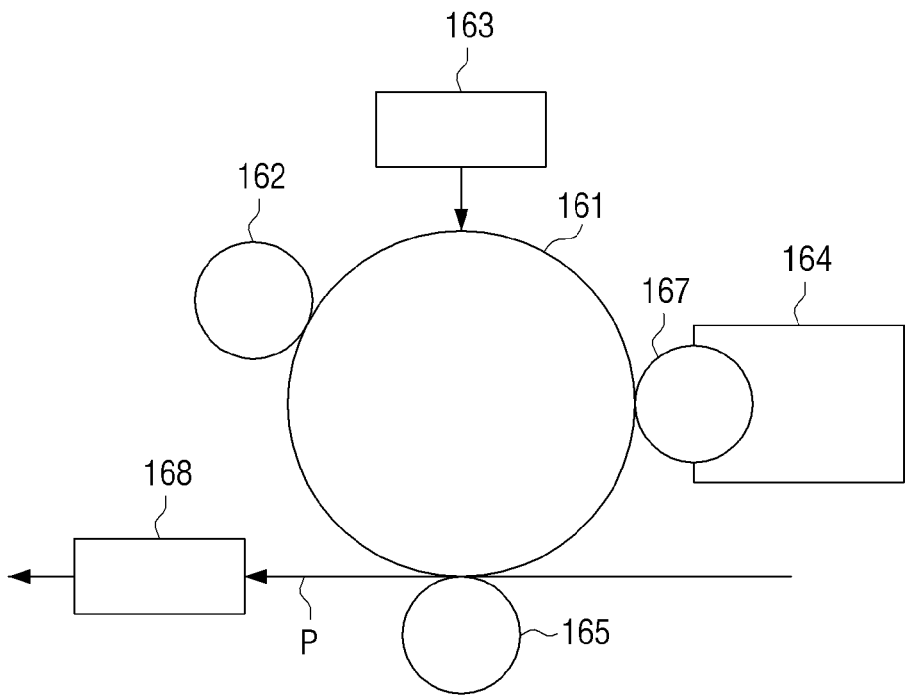

[Fig. 5]
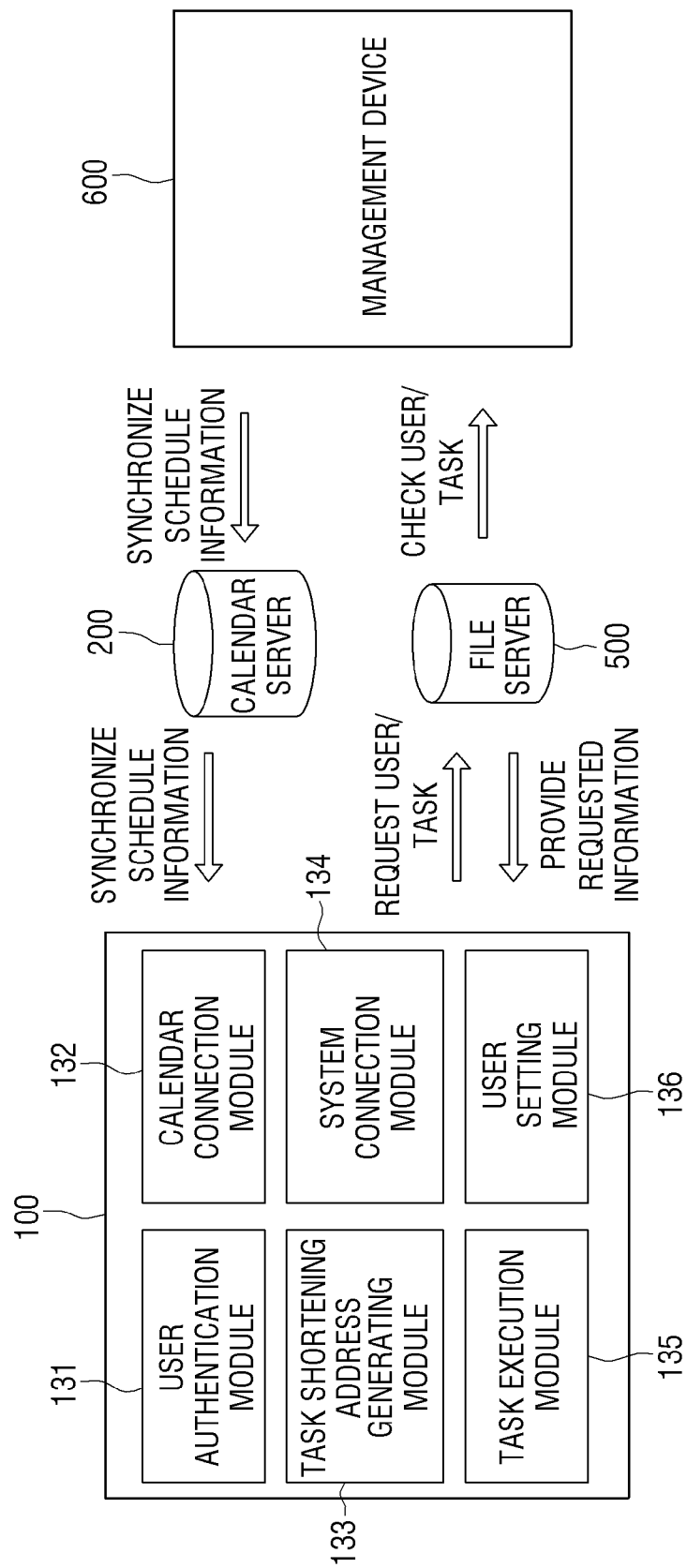

[Fig. 6]
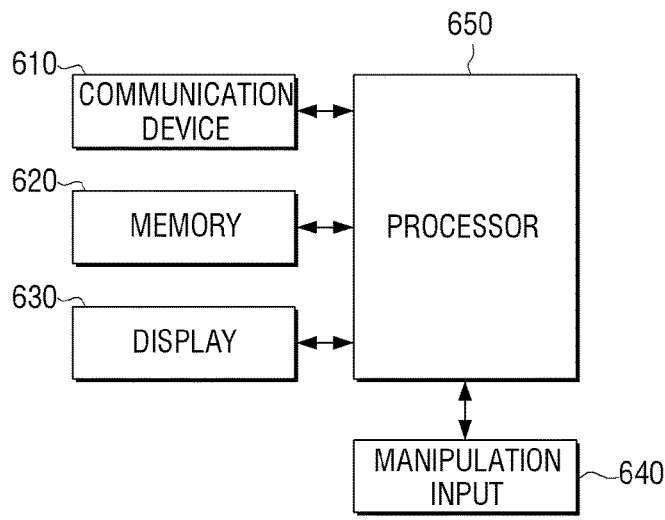
[Fig. 7]
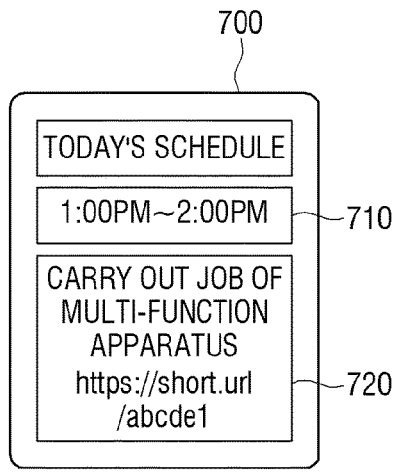
[Fig. 8]
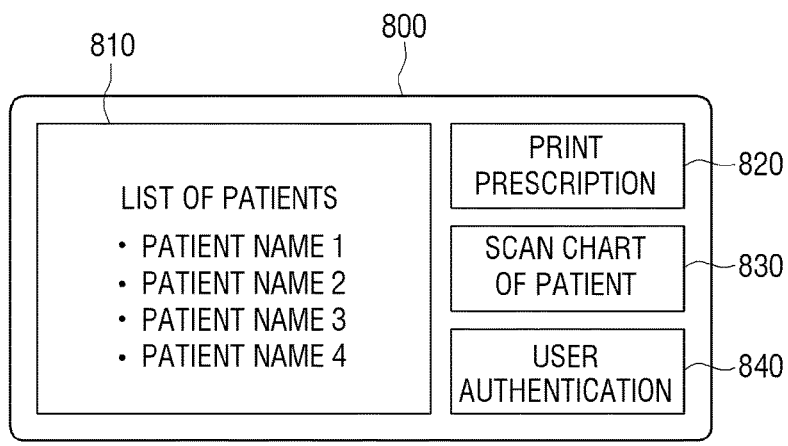

[Fig. 9]
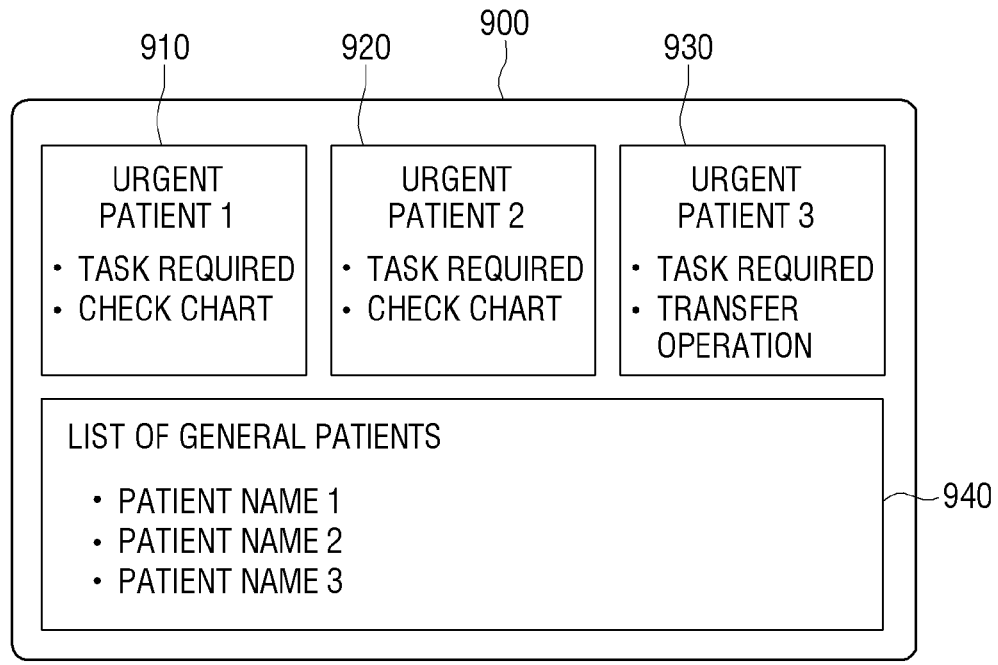
[Fig. 10]
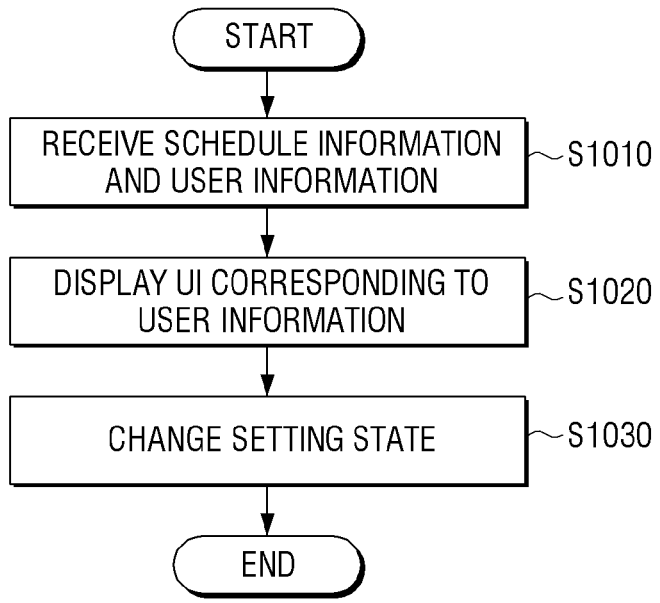

[Fig. 11]
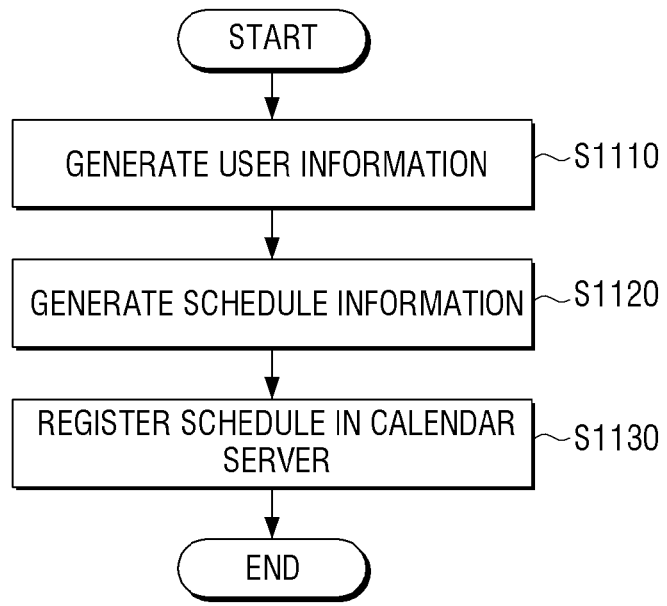

IMAGE FORMING APPARATUS USING CALENDAR INFORMATION AND METHOD OF USING IMAGE FORMING APPARATUS

BACKGROUND ART

Advances in electronic technology have allowed for the introduction and use of a variety of electronic products in many fields. For example, as computer propagation has been popularized, the supply rate of computer peripherals is increasing. Computer peripherals refer to devices for improving the utility of computers. For example, image forming devices such as printers, scanners, copiers, and multifunction peripherals may be computer peripherals.

In recent years, an image forming device is capable of connecting with a user system, and a user is able to directly access the user system from the image forming device and output data of the user system.

DISCLOSURE OF INVENTION

Brief Description of Drawings

The above and/or other aspects, features, and advantages of certain examples of the disclosure will be more apparent from the following description taken in conjunction with the accompanying drawings, in which:

FIG. 1 is a diagram illustrating an image forming system according to an example;

FIG. 2 is a block diagram illustrating a brief configuration of an image forming apparatus, such as the image forming apparatus of FIG. 1, according to an example;

FIG. 3 is a block diagram illustrating a more detailed configuration of an image forming apparatus, such as the image forming apparatus of FIG. 1, according to an example;

FIG. 4 is a diagram illustrating a configuration of a print engine, such as the print engine of FIG. 3, according to an example;

FIG. 5 is a diagram illustrating a method for changing users according to an example;

FIG. 6 is a block diagram illustrating a configuration of a management device according to an example;

FIG. 7 is a diagram illustrating a user interface window displayable in a management device according to an example;

FIGS. 8 and 9 are diagrams illustrating various user interface windows that are displayable on a display, such as the display of FIG. 1, according to an example;

FIG. 10 is a flowchart of a method for changing users in an image forming apparatus according to an example; and FIG. 11 is a flowchart of a method for registering schedules in a management device according to an example.

Throughout the drawings, it should be noted that like reference numbers are used to depict the same or similar elements, features, parts, components, and structures.

MODE FOR THE INVENTION

Various examples will now be described more fully with reference to the accompanying drawings. The examples described below may be modified and implemented in various different forms. In order to more clearly describe the features of the examples, a detailed description of known matters to those skilled in the art will be omitted.

In the present disclosure, a case in which any one feature is connected with another feature includes a case in which the features are directly connected with each other and a case in which the parts are electrically connected with each other with other features interposed therebetween. Further, when an example is stated as "comprising" a certain feature, unless otherwise stated, this means that the certain feature may include another feature, rather than foreclosing the same.

The term "image forming job" as used herein may mean any of various jobs related to an image (e.g., printing, scanning, copying, faxing, or the like), such as forming an image or creating/storing/transmitting an image file. In addition, "job" may mean not only an image forming operation but also a series of processes necessary for performing an image forming operation.

An image forming apparatus generally operates to print out print data generated at a terminal such as a computer onto a printing paper. An example of an image forming apparatus includes a copier, a printer, a scanner, a facsimile, and a multifunction printer (MFP) that provides combined functionality of at least two of the single apparatuses. The image forming apparatus may refer to any apparatus capable of performing an image forming operation, such as a copier, a printer, a scanner, a fax machine, an MFP, a display apparatus, or the like.

In addition, "hard copy" may refer to an operation of outputting an image on a printing medium such as paper, or the like, and "soft copy" may refer to an operation of outputting an image to a display apparatus, such as a TV, a monitor, or the like, or to a memory.

In addition, "content" may refer to any type of data that is subject to an image forming operation, such as a photo, an image, a document file, or the like.

In addition, "print data" may refer to data that is converted into a format printable in a printer. If a printer supports direct printing, the file itself may be print data.

In addition, "user" may refer to a person who performs an operation related to an image forming operation using an image forming apparatus or a device connected to the image forming apparatus via wire or wirelessly. In addition, "manager" may refer to a person who has the authority to access all functions and the system of the image forming apparatus. The "manager" and the "user" may be the same person.

FIG. 1 is a diagram illustrating an image forming system according to an example.

Referring to FIG. 1, an image forming system 1000 may include an image forming apparatus 100, a calendar server 200, a first authentication server 300, a second authentication server 400, and a file server 500.

The image forming apparatus 100 may receive schedule information and user information from the calendar server 200. The image forming apparatus 100 may display a user interface window for a schedule corresponding to a current time or time period and user information corresponding to the schedule. In this regard, the schedule information may include information related to a schedule to be carried out by the image forming apparatus 100 at a particular time or for a particular time period, and may, for example, be a schedule that a particular user uses at a particular time or for a particular time period, a schedule in which a particular user group uses the image forming apparatus 100 at a particular time or for a particular time period, or the like. In this regard, the time or the time period may be in units of hours, a time of the day (e.g., morning, afternoon, night, etc.), in units of days, or the like.

The user information may be information related to a user that desires to use or is capable of using an image forming apparatus at a particular time or time period and may be information from which the user may be identified (e.g., ID, name, or the like). The user information may include information which is used to access a file server of the corresponding user (e.g., login information related to the file server), task information assigned to the corresponding user, menu information for the corresponding user, setting information, or the like.

The image forming apparatus 100 may receive various task commands via a displayed user interface window and carry out a function corresponding to the received task command. Examples of the image forming apparatus 100 will be described below by referring to FIGS. 2 and 3.

The calendar server 200 is a server providing a calendar service. The calendar service may support any of various functions such as creating, modifying, deleting, and subscribing to a schedule. The calendar server 200 may be an exclusive server for providing a schedule to the image forming apparatus 100 or may be a server providing a calendar service that is available to the public.

The image forming apparatus 100 is capable of receiving a schedule from the calendar server 200 using a public interface of a commonly-used calendar server 200. Also, the manager or the user may check or modify a schedule of the image forming apparatus 100 using a user terminal (e.g., a personal computer (PC), a smartphone, or the like).

A schedule registered in the calendar server 200 may be created in a management device or may be created in a user terminal or the image forming apparatus 100 and registered in the calendar server 200.

The first authentication server 300 stores authentication information about a user that is authorized to use the image forming apparatus 100. The first authentication server 300 may, when an authentication request is received from the image forming apparatus 100, carry out an authentication processing using the received request and the pre-stored authentication information. In this regard, the authentication processing may include an authentication using an ID, a password, a secret key, a processing method using near field communication (NFC) information, or the like.

The second authentication server 400 stores authentication information about a user that is authorized to use the file server 500. The second authentication server 400 may, when an authentication request is received from the file server 500, carry out an authentication processing using the received request and the pre-stored authentication information. In this regard, the authentication processing may include an authentication using an ID, a password, a secret key, NFC information, or the like.

The file server 500 is a server storing a file or information that only a particular user can use. In an example, the file server 500 is part of a user system that is used in a vertical market.

The term "vertical market" refers to a market in which consumer layers in need of a product are classified by hierarchy, and may include, for example, a legal market providing legal and related services, a healthcare market providing a medical service, an education market providing education and related services, a finance market providing a financial and related services, or the like.

In addition, the term "vertical system" refers to a system which is used when users of the vertical market handle tasks using Information and Communication Technology (ICT), such as when using a PC, a mobile device, an own system, or the like.

If the image forming apparatus 100 is used in a vertical system, a procedure of primarily proceeding with authentication for using the image forming apparatus 100 and re-executing an application and program for an additional system used in each office environment and logging in is necessary.

If it is necessary that each user carries out an additional complicated environment setting according to characteristics of the vertical market or that each user cannot but use a particular data, such a cumbersome login and execution procedure brings about a decrease of work efficiency of the user. In addition, if each office environment requires an additional application or program, an additional development cost or an introduction cost may be incurred.

According to an example, the above-described authentication procedure is carried out using the calendar server 200, and thereby the user can more readily use the vertical system.

According to an example, when a predetermined schedule is processed, the image forming system 1000 carries out a task corresponding to the schedule that the image forming apparatus 100 needs in advance, and thereby the user can more efficiently proceed with his or her task.

In addition, since a public calendar service is used, the expandability of an inner system and an image forming apparatus can be provided. In other words, even in the case where various users use a desktop PC, a mobile device, and systems of different platforms in various office environments, the users can use the systems interchangeably with various devices, platforms, and systems by means of the public interface.

Referring again to FIG. 1, it is described that the first authentication server 300 and the image forming apparatus 100 are separate devices. However, the first authentication server 300 and the image forming apparatus 100 may be implemented as one apparatus. In addition, the second authentication server 400 and the file server 500 may also be implemented as one apparatus, and there may be more than one file server 500.

In addition, the image forming apparatus 100 may be connected with one file server 500, but may be connected with file servers 500 of different types.

FIG. 2 is a block diagram illustrating a brief configuration of an image forming apparatus, such as the image forming apparatus of FIG. 1, according to an example.

Referring to FIG. 2, the image forming apparatus 100 may include a communication device 110, a display 120, and a processor 130.

The communication device 110 may connect the image forming apparatus 100 to an external device. For example, the communication device 110 may be connected to the external device through not only a local area network (LAN) or the Internet but also a universal serial bus (USB) port or a wireless communication (e.g., Wi-Fi 802.11a/b/g/n, NFC, or Bluetooth) port. The communication device 110 may be referred to as a "transceiver."

The communication device 110 may receive schedule information and user information from the calendar server 200. For example, the communication device 110 may receive, from the calendar server 200, schedule information about a schedule and user information corresponding to a particular schedule at predetermined time intervals. The schedule information may include information about scheduled events, tasks, or the like for different times or time periods. In addition, the communication device 110 may check a schedule registered in the calendar server 200 in real time.

The communication device 110 may request user authentication to the first authentication server 300 and receive the authentication result from the first authentication server 300.

For example, the communication device 110 may provide login information received from the user, the tagged NFC information, or the like to the first authentication server 300, and receive, from the first authentication server 300, the authentication result of the image forming apparatus 100 for the current user. As another example, the image forming apparatus 100 may request authentication via the calendar server 200 instead of directly requesting the authentication result to the first authentication server 300 and may also receive the authentication result via the calendar server 200.

The communication device 110 may request user authentication for the file server 500 and receive the authentication result from the file server 500. In this regard, the communication device 110 may request user authentication for the file server 500 to the file server 500 by using user information received from the calendar server 200. The file server 500 having received a request for user authentication may request authentication to the second authentication server 400, receive the result, and determine whether to authorize the user according to the result.

In another example, the communication device 110 may also request authentication for the user to the calendar server 200, not the file server 500, and receive the authentication result for the file server 500 via the calendar server 200.

The communication device 110 receives task information of the user corresponding to the user information from the file server 500 based on the user information. For example, the communication device 110 may automatically proceed with the authentication procedures for the file server 500 by means of the login information for the file server 500 from among the user information received in the calendar server 200 and may receive task information for the corresponding user after the authentication is completed.

In this regard, the communication device 110 may not only receive a list of tasks available for the user but also receive in advance a file (e.g., print data) to carry out the corresponding task. In addition, the communication device 110 may check in real time whether a change has been made to the task information of the user, and when the change of the task information of the user is sensed during the use by the user, immediately receive the changed task information.

The communication device 110 may, when data (e.g., scan data) requested by the user is generated in the image forming apparatus 100, transmit the generated data to the file server 500.

The display 120 displays a user interface window to select a function supported by the image forming apparatus 100. For example, the display 120 may display a user interface window to select various functions provided by the image forming apparatus 100. The display 120 may be a monitor such as a liquid crystal display (LCD), a cathode ray tube (CRT), a light emitting diode (LED), an organic LED (OLED), or the like, and may also be implemented as a touch screen which is capable of simultaneously carrying out the functions of a manipulation input which will be described later.

The display 120 may display a user interface window corresponding to the received user information. For example, the display 120 may display a user interface window corresponding to menu information corresponding to the user information received from the calendar server 200. In this regard, the menu information may be included in the user information, and may be provided from the file server 500 by means of the login information for the file server included in the user information.

The menu information may include a menu screen which is specialized for the corresponding user or a user group. The menu information may be generated by a setting of the user or a setting of a manager belonging to a user group, or may be automatically generated by a menu frequently used by the corresponding user. Examples of types of menu information will be explained with reference to FIGS. 8 and 9 hereinafter.

The display 120 may display a user interface window including an authentication screen for authorizing a user corresponding to the user information. For example, in the case of a schedule in which a user A is registered to use the image forming apparatus 100 at a particular time, when the corresponding schedule is entered, a user interface window for authorizing the user A may be displayed. Through this operation, the user A can more easily carry out the authentication procedures with an operation of inputting only a password for authorization.

For example, in order for a user to proceed with an authentication in the image forming apparatus 100 requiring authentication using ID/PW, it is necessary to carry out authentication by inputting both the ID and the PW. However, if the image forming apparatus 100 is assigned to a particular user due to a schedule, the user of the corresponding schedule may complete the authentication procedures by only an operation of inputting a PW.

The image forming apparatus 100 may also simultaneously proceed with the authentication procedures for the file server 500 by interlocking with the authentication procedures described above.

The processor 130 controls the respective operations in the image forming apparatus 100. For example, the processor 130 may control the communication device 110 to access the calendar server 200 by the unit of a predetermined time period or according to an event occurrence and receive schedule information and user information.

In more detail, the processor 130 may receive schedule information, user information, to-do information, or the like from the calendar server 200 via the communication device 110 and classify the schedule information for each time or time period and a corresponding user, user group, or the like. The schedule information may be registered in the image forming apparatus 100 in the form of a scheduled task so that work to be done as stated in the corresponding schedule may be carried out according to time.

In addition, the processor 130 may verify whether the received user information is identical to the user information registered in an internal system and register the user information in the image forming apparatus 100. The processor 130 may check whether setting information, screen change information, or the like previously set by the registered user is present and may perform registrations in the image forming apparatus 100.

When a time point corresponding to the received schedule has been reached, the processor 130 may control the display 120 to display a user interface window (i.e., a menu screen for which the corresponding user is preset) corresponding to the received user information.

In this regard, the processor 130 may access the file server 500 by using the received user information, receive task information of the user corresponding to the user information, and control the display 120 to display the received task information on the user interface window.

In addition, the processor 130 may change a setting state in the image forming apparatus 100 to have a setting environment corresponding to the user information. For example, in the case where a particular user sets a power save mode and prefers color printing, the processor 130 may set, in advance, a color printing and a power save mode for the print options for the schedule used by the particular user.

In addition, when scan data is generated by the task request of the user, the processor 130 may control the communication device 110 to transmit the generated scan data to a storage of a file server corresponding to the user information.

When a change is made to the schedule, the processor 130 may delete information corresponding to the user of the previous schedule. For example, in the case where a schedule used by a particular user A is changed to a schedule available for all users, the processor 130 may change a menu screen specialized for the particular user A to a general user screen, and delete all previously-received task data of the particular user A.

The processor 130 may be configured as a central processing unit (CPU), an application specific integrated circuit (ASIC), or the like, and may be configured to be a plurality of processors.

An example operation of the processor 130 in consideration of a particular situation will be described below.

In a case in which a schedule in which a user A uses the image forming apparatus 100 from 9 AM to 1 PM is registered in the calendar server 200, and a schedule B in which a user B uses the image forming apparatus 100 from 1 PM to 5 PM is registered in the calendar server 200, the processor 130 may schedule this schedule change of the user in advance through a schedule of the subscribed calendar.

Regarding the schedule of user A, the processor 130 may receive, in advance of 9 AM, setting information, screen information, to-do information, information about a document to be carried out, or the like of the user A through an external calendar service and an internal user system.

In addition, the processor 130 may check the setting information and automatically change a print setting, scan setting, fax setting, or the like of the image forming apparatus 100. For example, a print setting may be changed so that a black and white document is output on both sides, and a scan storage setting may be changed so that a document is stored in a user A folder in the internal system. In addition, in the fax address book, phone numbers frequently used by the user A are registered in favorites, and the fax transmission method may be set such that only a digital circuit, not an analog telephone, is available.

In addition, the processor 130 may control the display 120 to display various information according to preferences of the user A, such as to-do information on the main screen and frequently-used function icons on the home screen.

In a case in which a document to be printed and checked by the user A is present, the processor 130 may download the corresponding document from the file server 500 in advance and store the downloaded document in a memory. In addition, in a case in which a task to be scanned and sent to the file server 500 by the user is present, the processor 130 may display the task on the screen to allow the user A to immediately check it, using a to-do widget or the like. In addition, the processor 130 may omit the user authentication procedures according to settings of the user A.

When the morning schedule is completed at 1 PM, the processor 130 may automatically switch to an environment for the user B according to a schedule registered in the calendar server 200. In more detail, the processor 130 may end or delete all tasks used by the user A, and switch to an environment for the user B. For example, the print settings of the image forming apparatus 100 may be changed to color, and the fax job may be changed such that only the analog circuit is available.

The processor 130 may control the display 120 to display a user interface window in which a home screen having five function icons and a situation indication board of the entire division are simultaneously displayed. In addition, the processor 130 may prepare documents for the user B by automatically downloading the documents and may change the user authentication procedures to use an ID card.

As described above, the image forming apparatus 100 may prepare an environment for each user according to a pre-registered schedule in advance, and thereby it is possible to significantly improve the efficiency and convenience of the users.

In addition, a public calendar service may be used and thereby, the expandability of an inner system and an image forming apparatus 100 can be provided. For example, even in the case where various users use a desktop PC, a mobile device, or systems of different platforms in various office environments, the users can use the systems interchangeably with various devices, platforms, and systems by means of the public interface.

Although the above description illustrates and explains a simple constitution of an image forming apparatus, various units may be additionally included in actual implementation. This will be described below with reference to FIG. 3.

FIG. 3 is a block diagram illustrating a more detailed configuration of an image forming apparatus, such as the image forming apparatus of FIG. 1, according to an example.

Referring to FIG. 3, the image forming apparatus 100 may include the communication device 110, the display 120, the processor 130, a memory 140, a manipulation input 150, a print engine 160, and a scanner 170.

The communication device 110, the display 120, and the processor 130 are explained in FIG. 2, and thus will not be further explained below for the sake of brevity.

The memory 140 may store address information to access the calendar server 200 and server access history (e.g., ID/PW for accessing the calendar server). In addition, the memory 140 may store schedule information received from the calendar server 200 and user information for a particular schedule.

In addition, the memory 140 may store setting information for a particular user. The setting information may be included in the user information and provided via the calendar server 200, and may be provided via the file server 500 as well.

In addition, the memory 140 may store task information received from the file server 500. In this regard, the task information may simply be a list of tasks to be carried out by the user, and may include actual data for each of the tasks.

The memory 140 may be implemented by a storage medium in the image forming apparatus 100 or an external storage medium, for example, a removable disk including a USB memory or a web server through a network.

The manipulation input 150 may receive an input of a user's function selection and a control command for the corresponding function. The function may include printing, copying, scanning, fax transmission, or the like. Such function control command may be received through a control menu displayed on the display 120.

In addition, the manipulation input 150 may receive a schedule in the image forming apparatus 100 from the user. The schedule received from the user may be registered in the calendar server 200 through the communication device 110.

The manipulation input 150 may be implemented as a plurality of buttons, keyboard, mouse, etc., and may also be implemented as a touch screen capable of simultaneously performing the functions of the display 120 described above.

The print engine 160 may form an image. The print engine 160 may form an image on the image forming medium on which the image is formed, such as a photosensitive drum, an intermediate transfer belt, or a sheet conveyance belt. An example of the print engine 160 will be described later with reference to FIG. 4.

The scanner 170 reads manuscripts. In more detail, the scanner 170 may scan manuscripts loaded onto a flatbed or an automatic document feeder (ADF) and generate scan data.

As described above, the image forming apparatus 100 according to an example receives schedule information and user information from the calendar server 200, and automatically changes a setting value to an optimized environment for the user to use the image forming apparatus 100 for the corresponding schedule in accordance with the received schedule or proceeds with authentication with a file server. Accordingly, the user can readily use the image forming apparatus.

In FIGS. 1-3, it was described that the image forming apparatus 100 periodically receives schedule information or the like from the calendar server 200. However, an example may be implemented in the form that the calendar server 200 provides schedule information or the like to the image forming apparatus 100 on a predetermined cycle.

FIG. 4 is a diagram illustrating a configuration of a print engine, such as the print engine of FIG. 3, according to an example.

Referring to FIG. 4, the print engine 160 may include a photosensitive drum 161, a charger 162, an exposure device 163, a developer 164, a transfer device 165, and a fixing device 168.

An electrostatic latent image is formed in the photosensitive drum 161. The photosensitive drum 161 may be referred to as a photosensitive drum, a photosensitive belt, or the like, according to forms.

Hereinafter, for the convenience of explanation, the feature of the print engine 160 corresponding to one color will be described as an example, but at the time of implementation, the print engine 160 may include a plurality of photosensitive drums 161 corresponding to a plurality of colors, a plurality of chargers 162, a plurality of exposure devices 163 and a plurality of developing devices 164. In this case, the print engine 160 may further include an intermediate transfer belt for forming images formed in a plurality of photosensitive drum on one printing paper.

The charger 162 charges the surface of the photosensitive drum 161 to a uniform potential. The charger 162 may be implemented as a corona charger, a charging roller, a charging brush, or the like.

The exposure device 163 may change the surface potential of the photosensitive drum 161 based on information on an image to be printed to form an electrostatic latent image on the surface of the photosensitive drum 161. As an example, the exposure device 163 may form an electrostatic latent image by irradiating the photosensitive drum 161 with light modulated in accordance with the information on the image to be printed. An exposure device 163 of this type may be referred to as a light scanning device or the like, and an LED may be used as a light source.

The developer 164 accommodates a developing agent therein, and develops the electrostatic latent image into a visible image through supply of the developing agent onto the electrostatic latent image. The developing device 164 may include a developing roller 167 for supplying the developer to the electrostatic latent image. For example, the developer may be supplied from the developing roller 167 to the electrostatic latent image which is formed on the photosensitive drum 161 by the developing electric field formed between the developing roller 167 and the photosensitive drum 161.

The visible image which is formed on the photosensitive drum 161 is irradiated to a recording medium (P) by the transfer device 165 or an intermediate transfer belt (not illustrated). The transfer device 165 may transfer the visible image to a recording medium, for example, by the electrostatic transfer method. The visible image is attached to the recording medium (P) by electrostatic attraction.

The fixing device 168 fixes a visible image on the recording medium P by applying heat and/or pressure to a visible image on the recording medium P. The printing operation is completed by this series of processes.

FIG. 5 is a diagram illustrating a method for changing users according to an example.

Referring to FIG. 5, an image forming apparatus 100 is connected with a calendar server 200 and a file server 500.

The image forming apparatus 100 may include a user authentication module 131, a calendar connection module 132, a task shortening address generating module 133, a system connection module 134, a task execution module 135, a user setting module 136, and a service platform to interlock the modules described above. In an example, the modules 131-136 may be implemented in a processor of the image forming apparatus 100, such as the processor 130.

The user authentication module 131 is a module to authorize a user. For example, the user authentication module 131 may authorize the user in a use environment of a vertical application. For example, all of a user authentication method of an image forming apparatus, a user authentication method using an external authentication module, and an integrated user authentication (e.g., Single Sign On) method may be supported. In addition, the user authentication module 131 may carry out a function which is capable of switching users through user information registered in a calendar.

The calendar connection module 132 is a module for connecting with the calendar server 200. For example, the calendar connection module 132 may control the communication device 110 to access an external calendar service and receive user information, schedule information, to-do information, or the like. In addition, the calendar connection module 132 may transmit the acquired information to each of the user authentication module 131, the user setting module 136, and the task execution module 135. If necessary, it is possible to upload the modified information to the server 200 again.

The task shortening address generating module 133 is a module for creating a uniform resource locator (URL) address at which to-do information corresponding to the user information may be identified from an external source. This will be described below with reference to FIG. 7.

The system connection module 134 is a module for connecting with a user system (i.e., the file server 500). For example, the system connection module 134 may serve to connect with an internal system (e.g., the file server 500) used in the office environment or a particular vertical market. For example, the system connection module 134 may carry out a function of acquiring user information through communication with the file server 500, transmitting task data, transmitting data for carrying out tasks through an image forming apparatus, transmitting task information that other users need, or the like.

The task execution module 135 is a module for generating and executing tasks. For example, the task execution module 135 may serve to carry out a task using data received via the calendar server 200 or the file server 500. If necessary, the task execution module 135 may display data to a user via the display 120, and carry out a task by receiving a user input. For example, the task execution module 135 may print print data in the image forming apparatus. The printed data may be transmitted to the file server 500 as necessary.

The user setting module 136 is a module which is capable of storing/converting user setting data. For example, the user setting module 136 is a module which stores various setting information corresponding to the user in the memory 140 or the file server 500.

It is illustrated and described above that the processor 130 includes a plurality of modules. However, it may be implemented such that the above-described plurality of modules are processed by one element and that the plurality of modules are processed by one element for each group. In addition, the function described above may be carried out by only an operation that some of the modules described above are implemented as a program and installed in the image forming apparatus 100.

A management device 600 registers a schedule in the calendar server 200 and manages users of the file server 500. The management device 600 may be a PC, a smartphone, or the like.

The management device 600 may query and modify information about the user from the file server 500 and register a schedule, to-do information, etc. for each user acquired therefrom in an external calendar server 200 or register changes from an external service in an internal user system.

The management device 600 may access the file server 500 and invoke user information and authentication information by division, group, individual, or the like. In addition, the management device 600 may access the external calendar service and generate a necessary calendar.

For example, a common calendar may be generated for each division, and the management device 600 may, using information about a user belonging to a division, set such that the target user may use the common calendar. In addition, a subscription authority of the user, user identification information capable of being connected to the authentication information, to-do information for each user, setting information of the image forming apparatus, or the like may be registered in the calendar.

In addition, a work schedule, working hours and assigned work for each user, setting information of an image forming apparatus, screen display information of the image forming apparatus, a storage location of a print job or a scan job, or the like are recorded in the calendar schedule. The schedule information may be changed or modified by a manager, a head of division, a head of group, or an individual user having the necessary authority. Also, the scope of modification may differ according to an authority assigned to a user.

When the calendar registration and user subscription are completed for each division, the management device 600 may register a schedule in the calendar server 200. When the schedule is registered in the calendar server 200, the created schedule may be associated or interlocked with the image forming apparatus 100.

An example of the management device 600 will be described below by referring to FIG. 6.

FIG. 6 is a block diagram illustrating a configuration of a management device according to an example.

Referring to FIG. 6, the management device 600 may include a communication device 610, a memory 620, a display 630, a manipulation input 640, and a processor 650.

The communication device 610 is formed to connect the management device 600 to an external device and may be connected to the management device through not only a local area network (LAN) or the Internet, but also a USB port or a wireless communication (e.g., Wi-Fi 802.11a/b/g/n, NFC, or Bluetooth) port. The communication device 110 may be referred to as a "transceiver."

The communication device 610 may register a schedule in the calendar server 200. For example, the communication device 610 may transmit a schedule created in the processor 650, which will be described later, to the calendar server 200 and register the transmitted schedule.

In addition, the communication device 610 may also receive a schedule registered in the calendar server 200.

The communication device 610 may receive user information and authentication information from the file server 500. For example, the communication device 610 may access the file server 500 and receive user information for each division, group, and individual, and authentication information for each user information.

The memory 620 stores a program for driving the management device 600. For example, the memory 620 stores a program which is a set of various types of commands necessary to drive the image forming apparatus 100. In this regard, the program includes not only an application (or, an application program) for generating calendar information or using the file server 500 but also an operating program for driving the application.

The memory 620 may store user information and authentication information received from the file server 500, and store the generated schedule information.

The memory 620 may be implemented by a storage medium in the management device 600 or an external storage medium, for example, a removable disk including a USB memory or a web server through a network.

The display 630 displays a user interface window to select a function supported by the management device 600. The display 630 may be a monitor such as an LCD, CRT, LED, OLED, or the like, and may also be implemented as a touch screen which is capable of simultaneously carrying out the functions of the manipulation input 640 which will be described later.

The display 630 may display a user interface window for receiving a schedule. For example, the display 630 may display a user interface window for setting information about an image forming apparatus to carry out a schedule, a schedule to be carried out in the corresponding image forming apparatus, a time or a time period of the corresponding schedule, a user to carry out the corresponding schedule, or the like.

The manipulation input 640 may set information about an image forming apparatus to carry out a schedule, a schedule to be carried out in the corresponding image forming apparatus, a time or a time period of the corresponding schedule, a user to carry out the corresponding schedule, or the like. The manipulation input 640 may be implemented as a plurality of buttons, a keyboard, a mouse, etc., and may also be implemented as a touch screen capable of simultaneously performing the functions of the display 630 described above.

The processor 650 may control each unit within the management device 600. For example, when a schedule registration application is registered, the processor 650 may control the communication device 610 to receive user information and authentication information for each division, group, individual, or the like.

In addition, the processor 650 may control the display 630 to display a user interface window capable of receiving various settings to generate schedules. When a setting is input via the manipulation input 640, the processor 650 may generate a schedule, and control the communication device 610 to register the generated schedule in the calendar server 200.

FIG. 7 is a diagram illustrating a user interface window displayable in a management device according to an example.

Referring to FIG. 7, a user interface window 700 includes a time information area 710 and a work schedule area 720.

The time information area 710 may display information about a time or a time period of a schedule set in the image forming apparatus 100. For example, the time information area 710 may display information such as a time period (e.g., 1:00 PM-2:00 PM) of a scheduled event, the time period being in terms of hours. Alternatively, the time information area 710 may display other time period information such as a start time, a day, a week, a part of the day, or the like of a scheduled event.

The work schedule area 720 may display information about a task, an event, a work related item, or the like that is scheduled to be carried out in the corresponding schedule. In the illustrated example, a URL address is displayed. In another example, information provided by the corresponding URL may also be displayed.

The URL may be generated when the manager registers a schedule, may be generated in a file server, may be directly generated in the image forming apparatus, or the like. When the user accesses the calendar service and identifies a short URL, it is possible to check a job assigned to the corresponding URL or immediately carry out the corresponding job.

For example, in a case in which it is necessary to check a document for approval, the document may be displayed on a user mobile device and the user may complete approval of the document via an OK button. As another example, when it is necessary that a document is uploaded to the user system, the user checks a schedule alarm and captures the document with a camera of the user's mobile device. Thereafter, when a short URL is touched, a screen for uploading a document is displayed and the user may complete the job by uploading the document captured a moment ago to the screen.

One of the benefits of using an external calendar is that it is freely expandable to another mobile device. Users frequently using a mobile office environment may as necessary register an external calendar used by a division in its mobile device and use it. When a user registers a calendar in a mobile device, schedules of the calendar are displayed in a mobile schedule application. The user may check the entire or some calendar schedules according to assigned authorities. In addition, the user may proceed with modification for the registered schedules.

The user may check the jobs assigned thereto via a mobile application and may carry out the jobs. The user may not only check a schedule alarm, check a job for the registered schedule, and carry out the job, but also directly carry out a job via a short URL registered in the schedule. The short URL refers to a URL that reduces a URL capable of accessing an internal system or an image forming apparatus to be highly readable.

In an example, an external calendar is used and it is thus possible to readily identify a user task from a mobile device.

The operation in the case where the present disclosure is applied to a vertical market, such as a hospital, will be described below with reference to FIGS. 8 and 9.

FIGS. 8 and 9 are diagrams illustrating various user interface windows that are displayable on a display, such as the display of FIG. 1, according to an example.

In the case where employee shifts occur frequently, as in a hospital, when an internal system and an image forming apparatus are used, the user experience can be improved and the work efficiency can thus be improved.

In the case of a hospital managing both outpatients and inpatients, work shifts of medical teams occur frequently. Due to the nature of the work, it is necessary that a medical team manages its assigned patients, and management methods specialized for the respective characteristics of target patients, such as outpatients, inpatients, urgent patients, or the like, are demanded.

As an example, there is a case where a medical team works in three shifts and patients are assigned to each medical team. The A group medical team is working from 9 AM to 5 PM, and the B group medical team is working from 5 PM to 1 AM, and the C group medical team is working from 1 AM to 9 AM. It will be assumed that, according to the characteristics of each group, the A group mainly handles outpatients and hospitalization/discharge work, the B group handles patients requiring urgent treatment, such as an urgent patient or the like, and the C group takes care of and manages a condition of inpatients.

The medical team assigned to the A group includes a user A1 which is a doctor and users A2 and A3 which are nurses. The schedule of a medical team of each group is registered in a calendar according to a prearranged schedule, and the registered calendar may be transferred to the image forming apparatus and registered in the image forming apparatus.

Accordingly, when an activity of the A group medical team is started at 9 AM, the image forming apparatus 100 may display a user interface window as illustrated in FIG. 8.

Referring to FIG. 8, a user interface window 800 comprises a first area 810 displaying a patient, a prescription output area 820, a chart scan area 830, and a user authentication area 840.

The first area 810 is an area displaying a list of patients, which in this case are mainly outpatients.

The prescription output area 820 and the chart scan area 830 are areas for carrying out paperwork regarding received documents, a medical chart, prescription and medical expenses payment, or the like according to the result of treatment.

The user authentication area 840 is an area proceeding with authentication for a user to use the image forming apparatus 100. As an example, since external manpower enters and exits many times, the user authentication function may be activated in order to use the function of the image forming apparatus and only the user who has completed the user authentication through the user authentication area 840 may use the image forming apparatus 100.

As an example, when a duty of a patient is registered according to a prescription of the user A1 who is a doctor, the image forming apparatus 100 may receive patient data and documents required for carrying out the duty and display the patient data and documents.

When it is time for the B group medical team to start working at 5 PM, the image forming apparatus 100 may switch an environment of the image forming apparatus according to the registered calendar schedule.

To cope with urgent patients, the display 120 of the image forming apparatus 100 may display a list of emergencyoriented patients as illustrated in FIG. 9. In this regard, the image forming apparatus 100 may not carry out user authentication to handle emergency work. Instead, when a user belonging to the B group touches a task, such as a thing to do, on the user's mobile device and approaches the image forming apparatus, the corresponding task may be carried out by the image forming apparatus 100 and the document may be output.

Referring to FIG. 9, the user interface window 900 includes an emergency patient area 910, 920 and 930 and a general patient area 940.

When the C group medical team starts working at 1 AM, the image forming apparatus 100 may likewise automatically switch to a screen for nighttime patient management according to the registered calendar schedule so that it may be automatically switched to an environment in which the medical team can concentrate on its proper patient care without cumbersome settings.

The switching method as described above may be applied not only to a hospital environment but also to a law firm, or other business environment.

In a law firm, a person may handle various cases while performing work according to a set time. For example, from 9 AM to 6 PM, time may be allocated in advance according to the progress of the event distribution, reception, consultation, and trial. When a case to be handled from 9 AM to 11 AM is allocated to schedule on a half hourly basis, the user A working at a law firm may register a schedule for each case in a public calendar via the file server 500.

The image forming apparatus 100 may identify information of a public calendar according to the registered schedule and change settings and a screen of the image forming apparatus on a half hourly basis. For example, the display 120 of the image forming apparatus 100 may display a list capable of immediately outputting document information currently required for the litigation case.

If the lawyer B approaches the image forming apparatus and touches a list of documents displayed on the screen, the corresponding documents may be immediately output. In addition, in the case where documents required during that time are scanned, the documents may be automatically stored in a storage of the corresponding case. When 30 minutes have elapsed and the schedule is assigned to another case, the setting and screen of the image forming apparatus may also be automatically changed. If necessary, it is possible to request an additional user authentication procedure for each case.

In addition, the user switching method described above may be applied to schools or academies. For example, in schools and academies, in many cases, classes are held according to timetables and assignments are registered accordingly. For example, if there is a one-hour class, the user A, who is a teacher, may create a schedule on the public calendar in advance and store the education materials in the internal system.

In this regard, the image forming apparatus 100 may read the public calendar information and, when the corresponding class time has been reached, display a main screen of the image forming apparatus as a class subject and output materials stored in the internal system in advance.

The students participating in the class may attend the class with materials output in advance from the image forming apparatus 100. To submit an assignment, when the assignment is scanned for the corresponding time of the image forming apparatus 100, the image forming apparatus 100 may scan the assignment and store the scanned assignment in a storage related to the current class according to a predetermined schedule.

FIG. 10 is a flowchart of a method for changing users in an image forming apparatus according to an example.

Referring to FIG. 10, schedule information for a schedule for each time or time period and user information corresponding to a particular schedule are received from a calendar server, at operation S1010.

A user interface window for a schedule corresponding to the current time or time period and user information corresponding to the schedule is displayed at operation S1020. For example, a user interface window comprising a menu screen preset by a user corresponding to the user information may be displayed. In this regard, the user interface window may include task information of the user received from a file server, an authentication screen for authorizing a user corresponding to the user information, or the like.

On the basis of the user information, a setting state for the function supported by the image forming apparatus is changed at operation S1030. For example, corresponding to the received user information, a print option, a scan option, a fax option, an address book, or the like may be changed to information corresponding to a particular user.

Accordingly, the user switching method may include preparing an environment for each user according to a pre-registered schedule in advance, and thereby it is possible to significantly improve the efficiency and convenience according to switching of users. In addition, a public calendar service is used and thereby the expandability of an inner system and an image forming apparatus can be provided. Even in the case where various users use a desktop PC, a mobile device, or systems of different platforms in various office environments, the users can use the systems interchangeably with various devices, platforms, or systems by means of the public interface. The user switching method of FIG. 10 may be performed on the image forming apparatus having the constitution of FIGS. 2 and 3 or performed on another image forming apparatus having a different constitution.

The above-described user switching method may be implemented as a program and provided to an image forming apparatus. In particular, the program including a method for switching users according to various examples may be stored in a non-transitory computer readable medium and provided therein.

The non-transitory computer readable medium refers to a medium that stores data semi-permanently rather than storing data for a very short time, such as a register, a cache, a memory, etc., and is readable by an apparatus. In more detail, the above-described various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), or the like, and may be provided.

FIG. 11 is a flowchart of a method for registering schedules in a management device according to an example.

Referring to FIG. 11, user information and authentication information for each division, group, individual, or the like may be received from the file server 500, and user information corresponding to the schedule may be generated based on the received information, at operation S1110.

Schedule information for schedule by time or time period may be generated based on the generated user schedule and time or time period information, at operation S1120.

When the schedule information is generated, the generated schedule information may be registered in the calendar server 200, at operation S1130.

The method for registering a schedule as illustrated in FIG. 11 may be executed on the management device having the configuration of FIG. 6, and may be executed on a management device having other configurations.

The above-described schedule registration method may be implemented in a program and provided to management devices. For example, the program including a method for registering a schedule according to example embodiments may be stored in a non-transitory computer readable medium and provided therein.

The foregoing examples and advantages are not to be construed as limiting the present disclosure. Rather, the present teaching can be readily applied to other types of apparatuses. Also, the description of the examples is intended to be illustrative, and not to limit the scope of the claims, and many alternatives, modifications, and variations will be apparent to those skilled in the art.

The invention claimed is:

1. An image forming apparatus, the image forming apparatus comprising:
 a display to display a user interface window for selecting a function supported by the image forming apparatus;
 a communication device to receive, from a calendar server, schedule information of a schedule of the image forming apparatus, the schedule including a first time period and a second time period, and user information corresponding to the schedule, the user information including information of a first user corresponding to the first time period and information of a second user corresponding to the second time period; and
 a processor to control the display to:
  display a first user interface window including a first menu screen during the first time period for the first user, and
  display a second user interface window including a second menu screen that is different from the first menu screen during the second time period for the second user.

2. The image forming apparatus as claimed in claim 1, wherein each of the first and the second menu screen is respectively preset by the first and the second user.

3. The image forming apparatus as claimed in claim 1, wherein the processor:
 controls the communication device to receive first task information of the first user and second task information of the second user from a file server based on the user information, and
 controls the display to respectively display the first and second user interface window including the received first and second task information.

4. The image forming apparatus as claimed in claim 3, wherein the processor proceeds with automatic authentication for the file server based on the user information.

5. The image forming apparatus as claimed in claim 3, further comprising:
 a print engine to form an image on a printing paper,
 wherein the processor:
  controls the communication device to receive print data corresponding to the first or the second task information, and
  based on a print command for the received print data being received, controls the print engine to print the received print data.

6. The image forming apparatus as claimed in claim 1, wherein the processor, based on the user information, changes a setting state for a function supported by the image forming apparatus.

7. The image forming apparatus as claimed in claim 1, wherein the processor controls the display to respectively display the first or the second user interface window including an authentication screen for authorizing the first or the second user.

8. The image forming apparatus as claimed in claim 1, further comprising:
 a scanner to scan a manuscript,
 wherein the processor, based on a scan data corresponding to a manuscript being generated, controls the communication device to transmit the generated scan data to a storage of a file server corresponding to the user information.

9. A user switching method of an image forming apparatus, the method comprising:
 receiving, from a calendar server, schedule information of a schedule of the image forming apparatus, the schedule including a first time period and a second time period, and user information corresponding to the schedule, the user information including information of a first user corresponding to the first time period and information of a second user corresponding to the second time period;
 displaying a first user interface window including a first menu screen during the first time period for the first user;
 displaying a second user interface window including a second menu screen that is different from the first menu screen during the second time period for the second user; and
 based on the user information, changing a setting state for a function supported by the image forming apparatus.

10. The user switching method as claimed in claim 9, wherein each of the first and the second menu screen is respectively preset by the first and the second user.

11. The user switching method as claimed in claim 9, further comprising:
 receiving, from a file server, first task information of the first user and second task information of the second user based on the user information,
 wherein the displaying comprises respectively displaying the first and second user interface window including the received first and second task information.

12. The user switching method as claimed in claim 11, further comprising:
 proceeding with automatic authentication for the file server based on the user information.

13. The user switching method as claimed in claim 11, further comprising:
 receiving print data corresponding to the first or second task information; and
 based on a print command for the received print data being received, printing the received print data.

14. The user switching method as claimed in claim 11, wherein the displaying comprises respectively displaying the first or second user interface window including an authentication screen for authorizing the first or second user.

15. The user switching method as claimed in claim 11, further comprising:
 generating scan data by scanning a manuscript; and
 transmitting the generated scan data to a storage of a file server corresponding to the user information.

16. A non-transitory computer readable medium including instructions for a user switching method of an image forming apparatus, the non-transitory computer readable medium comprising:

instructions to receive, from a calendar server, schedule information of a schedule of the image forming apparatus, the schedule including a first time period and a second time period, and user information corresponding to the schedule, the user information including information of a first user corresponding to the first time period and information of a second user corresponding to the second time period;

instructions to display a first user interface window including a first menu screen during the first time period for the first user;

instructions to display a second user interface window including a second menu screen that is different from the first menu screen during the second time period for the second user; and instructions to, based on the user information, change a setting state for a function supported by the image forming apparatus.

17. The non-transitory computer readable medium as claimed in claim 16, wherein each of the first and the second menu screen is respectively preset by the first and the second user.

18. The non-transitory computer readable medium as claimed in claim 16, further comprising:

instructions to receive, from a file server, first task information of the first user and second task information of the second user based on the user information, wherein the instructions to display comprise instructions to respectively display the first and second user interface window including the received first and second task information.

19. The non-transitory computer readable medium as claimed in claim 18, further comprising:

instructions to proceed with automatic authentication for the file server based on the user information.

20. The non-transitory computer readable medium as claimed in claim 18, further comprising:

instructions to receive print data corresponding to the first or second task information; and instructions to, based on a print command for the received print data being received, print the received print data.

* * * * *